(12) United States Patent
Almeida et al.

(10) Patent No.: US 10,716,087 B1
(45) Date of Patent: Jul. 14, 2020

(54) DYNAMIC GEO-LOCATION AND TIME SYNCHRONIZATION

(71) Applicant: CSC HOLDINGS, LLC, Bethpage, NY (US)

(72) Inventors: Heitor J. Almeida, Elmsford, NY (US); Jaison Antony, Dix Hills, NY (US); John Markowski, Smithtown, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 77 days.

(21) Appl. No.: 16/042,543

(22) Filed: Jul. 23, 2018

(51) Int. Cl.
*H04W 64/00* (2009.01)
*H04M 3/22* (2006.01)
*H04M 3/30* (2006.01)
*G01S 19/01* (2010.01)

(52) U.S. Cl.
CPC .......... *H04W 64/003* (2013.01); *G01S 19/01* (2013.01); *H04M 3/2209* (2013.01); *H04M 3/30* (2013.01)

(58) Field of Classification Search
None
See application file for complete search history.

(56) References Cited

U.S. PATENT DOCUMENTS

| | | | | |
|---|---|---|---|---|
| 6,130,720 A | * | 10/2000 | Naimpally | H04N 7/08 348/553 |
| 7,028,327 B1 | * | 4/2006 | Dougherty | H04N 7/17318 348/E7.071 |
| 10,231,016 B2 | * | 3/2019 | Kim, II | H02M 1/16 |
| 2006/0156342 A1 | * | 7/2006 | Xiao | H04N 5/44543 725/50 |
| 2007/0150892 A1 | * | 6/2007 | Chaney | G06F 8/61 717/177 |
| 2010/0036912 A1 | * | 2/2010 | Rao | H04L 51/20 709/204 |
| 2011/0029565 A1 | * | 2/2011 | Estevez | G06Q 30/02 707/783 |
| 2011/0191811 A1 | * | 8/2011 | Rouse | H04N 21/25808 725/93 |
| 2019/0028777 A1 | * | 1/2019 | Rao | H04N 21/431 |

* cited by examiner

*Primary Examiner* — Lonnie V Sweet
(74) *Attorney, Agent, or Firm* — Sterne, Kessler, Goldstein & Fox P.L.L.C.

(57) ABSTRACT

The present disclosure describes an autonomous mechanism for seamlessly coordinating timing of subscriber devices in a service provider system based on the subscriber devices' physical geographic locations. The service provider system dynamically calibrates local times for subscriber devices in geographic locations around in the world without requiring additional local infrastructure. This calibration allows the subscriber devices to receive customized services specifically tailored to their physical geographic locations from the service provider system. Moreover, this autonomous mechanism allows the subscriber devices to be quickly re-purposed to different physical geographic locations without the need to manually configure each individual subscriber device prior to relocation.

20 Claims, 3 Drawing Sheets

DYNAMIC GEO-LOCATION AND TIME SYNCHRONIZATION

BACKGROUND

Service providers provide a service to subscriber devices. The provision of these services can occur according to a time-based schedule. Thus, subscriber devices need to be time-synchronized to receive the scheduled content offered by the service provider at appropriate times. Accordingly, service providers need to efficiently and accurately calibrate and synchronize local times across subscriber devices in disparate geographic locations.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

Overview

The present disclosure describes an autonomous mechanism for seamlessly coordinating timing of subscriber devices in a service provider system based on the subscriber devices' physical geographic locations. As to be described in further detail below, the subscriber devices store and/or retrieve a universal time, for example, years, months, days, hours, minutes, and/or seconds. This universal time represents a global time which is collectively shared by all of the subscriber devices within the service provider system irrespective of their physical geographic locations. Thereafter, the service provider system dynamically calibrates a local time for a subscriber device corresponding to the subscriber device's physical geographic location. This calibration allows the subscriber devices to receive customized services specifically tailored to their physical geographic locations from the service provider system. Moreover, this autonomous mechanism allows the subscriber devices to be quickly re-purposed to different physical geographic locations without the need to manually configure each individual subscriber device prior to relocation. This saves the service provider system costs associated with re-configuring the subscriber devices for deployment in different physical geographic locations, which can occur as the service provider system gains new subscribers and/or loses existing subscribers. Additionally, because dynamic calibration of local times uses ubiquitous functions and protocols, no additional infrastructure needs to be deployed across disparate and varied physical geographic locations.

Exemplary Point-to-Multipoint Communication System

Figure 1:
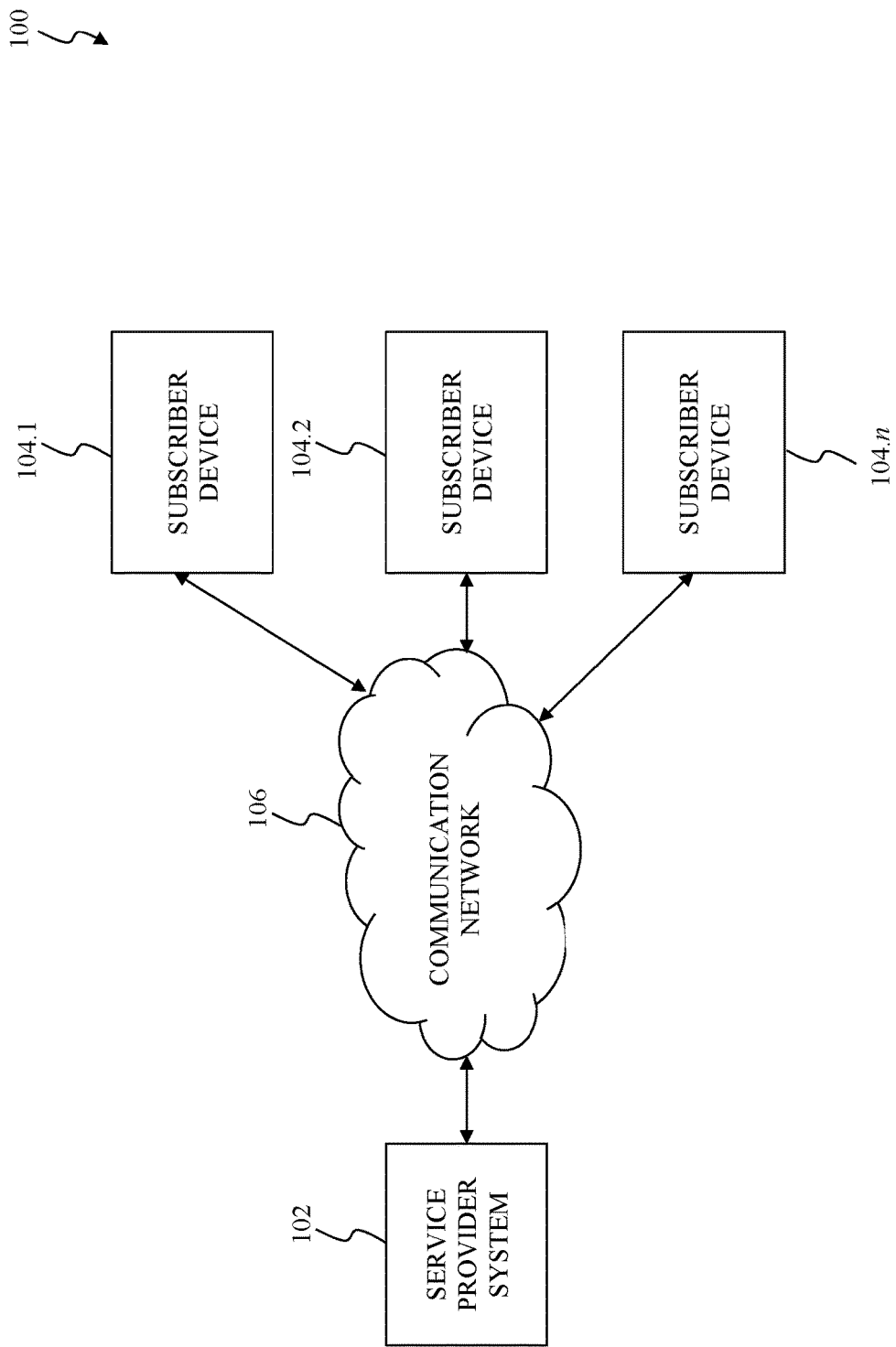
FIG. 1 illustrates a block diagram of an exemplary point-to-multipoint communication system, according to an embodiment of the present disclosure.

FIG. 1 illustrates a block diagram of an exemplary point-to-multipoint communication system according to an embodiment of the present disclosure. Point-to-multipoint communication system 100 includes service provider system 102, subscriber devices 104.1 through 104.n, and communication network 106.

Service provider system 102 can provide a service to subscriber devices 104.1 through 104.n. In an embodiment, content of this service can include video, audio, and/or data, such as movies, television shows, news, and/or sports programming to provide some examples. In one embodiment, this service can be universal and be provided to subscriber devices 104.1 through 104.n irrespective of their physical geographic location. In another embodiment, the service can be a localized service that is specially tailored to the physical geographic locations of subscriber devices 104.1 through 104.n. For example, service provider system 102 can offer the service according to a schedule, wherein the nature, type, program, or variety of the service can vary based upon local time of subscriber devices 104.1 through 104.n. Service provider system 102 can organize content offered by the service in an electronic program guide (EPG) for review by a subscriber.

Subscriber devices 104.1 through 104.n represent one or more personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, and/or other devices that are capable of transmitting and/or receiving video, audio, and/or data that will be apparent to those skilled in the relevant art(s) without departing from the spirit and scope of the present disclosure. In some situations, subscriber devices 104.1 through 104.n can receive particularized services based on the physical geographic locations that subscriber devices 104.1 through 104.n physically sit in, reside at, or inhabit. Because subscriber devices 104.1 through 104.n can reside in physical geographic locations across the globe, the local time of subscriber devices 104.1 through 104.n could differ among subscriber devices 104.1 through 104.n.

As illustrated in FIG. 1, subscriber devices 104.1 through 104.n store and/or retrieve a universal time, for example, years, months, days, hours, minutes, and/or seconds. This universal time represents a global, international, or worldwide time which is collectively shared by subscriber devices 104.1 through 104.n irrespective of their physical geographic locations. This universal time can be UT0, UT1, UT1R, UT2, Universal Coordinated Time (UTC), Greenwich Mean Time (GMT), Ephemeris time (ET), Coordinated Mars Time (MTC), and/or any other suitable universal time that will be apparent to those skilled in the relevant art(s) without departing from the spirit and scope of the present disclosure. In one embodiment, subscriber devices 104.1 through 104.n can use a standardized networking protocol such as network time protocol (NTP), user datagram protocol (DBP), or any suitable networking protocol that will be apparent to one skilled in the art(s) without departing from the spirit and scope of the present disclosure to retrieve the universal time from service provider system 102 or elsewhere, as will be apparent to one skilled in the art(s) without departing from the spirit and scope of the present disclosure.

In some situations, subscriber devices 104.1 through 104.n can interact with service provider system 102 to determine local times for their physical geographic locations. In the exemplary embodiment illustrated in FIG. 1, subscriber devices 104.1 through 104.n can send a secure transmission to service provider system 102 via communication network 106 which can include the universal time. For example, subscriber devices 104.1 through 104.n can employ secure sockets layer (SSL), transport layer security (TLS), or other suitable cryptographic protocol enabling secure communications to send the secure transmission. In this example, subscriber devices 104.1 through 104.n can timestamp the secure transmission with the universal time. Once subscriber devices 104.1 through 104.n establish secure connections to service provider system 102, service provider system 102 can retrieve appropriate physical geographic location information related to subscriber devices 104.1 through 104.n. In an embodiment, service provider system 102 can use unique identifiers for subscriber devices 104.1 through 104.n to retrieve the appropriate physical geographic location information for subscriber devices 104.1 through 104.n. This appropriate physical geographic location information can include a zip code, address, or other suitable information about physical position, domicile, or address of subscriber devices 104.1 through 104.n. Thereafter, service provider system 102 can send the appropriate physical geographic location information to subscriber devices 104.1 through 104.n. In an alternate embodiment, subscriber devices 104.1 through 104.n can use any other well-known location determination system that will be apparent to one skilled in the art(s) without departing from the spirit and scope of the present disclosure to determine their physical geographic locations.

In one embodiment, once subscriber devices 104.1 through 104.n determine their physical geographic locations, subscriber devices 104.1 through 104.n can calculate their time offsets. These time offsets can represent differences between the universal time, which is irrespective of physical geographic locations, and the local time, which is dependent on physical geographic locations. For instance, for a subscriber device in Eastern Daylight Time (EDT), this time offset could be −4. In some situations, subscriber devices 104.1 through 104.n can consider the applicability of daylight savings time when determining their time offsets. In an embodiment, subscriber devices 104.1 through 104.n can access a look-up table (LUT) to retrieve their time offsets using their physical geographic locations. Alternatively, or in addition to, subscriber devices 104.1 through 104.n can receive their time offsets from service provider system 102. In this alternative embodiment, service provider system 102 can provide subscriber devices 104.1 through 104.n their time offsets.

In an embodiment, subscriber devices 104.1 through 104.n can then calibrate their local times using their time offsets and the universal time. These local times can reflect times at the physical geographic locations that subscriber devices 104.1 through 104.n physically reside at, sit in, or inhabit. For example, subscriber devices 104.1 through 104.n can increment and/or decrement their stored universal times by their time offsets to calibrate their local times. In an alternate embodiment, these local times can be calculated by service provider system 102 and returned to subscriber devices 104.1 through 104.n.

The local times allow service provider system 102 to customize the service, as described above, provided to subscriber devices 104.1 through 104.n to be specifically tailored to their physical geographic locations. In an embodiment, service provider system 102 can provide and/or subscriber devices 104.1 through 104.n can receive the service at appropriate times in accordance with their local times. For example, service provider system 102 can provide content at a first local time to a first subscriber device among subscriber devices 104.1 through 104.n and at a second local time to a second subscriber device among subscriber devices 104.1 through 104.n. In this embodiment, the first subscriber device could display the content at the first local time, whereas the second subscriber device, located in a disparate geographical location than the first subscriber device, could display the same content at the second local time. In an embodiment, subscriber devices 104.1 through 104.n can record the service at appropriate times in accordance with their local times. For example, content offered by service provider system 102 can be provided at a first local time to a first subscriber device among subscriber devices 104.1 through 104.n and at a second local time to a second subscriber device among subscriber devices 104.1 through 104.n. In this embodiment, the first subscriber device could record the content at the first local time, whereas the second subscriber device, located in a disparate geographical location than the first subscriber device, could record the same content at the second local time.

Additionally, subscriber devices 104.1 through 104.n can organize the content of the service into various EPGs using their local times. These EPGs provide subscriber devices 104.1 through 104.n updated menus displaying the content currently being offered by service provider system 102 to subscriber devices 104.1 through 104.n at their local times and/or scheduling information for future content being offered by service provider system 102 to subscriber devices 104.1 through 104.n at their local times. EPGs can be arranged chronologically, i.e., displaying the content at local times of subscriber devices 104.1 through 104.n.

In another embodiment, subscriber devices 104.1 through 104.n can use their local times to download software updates at scheduled intervals or times. For example, service provider system 102 can schedule a software update to occur at a first local time to a first subscriber device among subscriber devices 104.1 through 104.n and at a second local time to a second subscriber device among subscriber devices 104.1 through 104.n. In this embodiment, the first subscriber device could download the software update at the first local time, whereas the second subscriber device, located in a disparate geographical location than the first subscriber device, could download the software update at the second local time. Subscriber devices 104.1 through 104.n can schedule other maintenance activities using their local times.

Communication network 106 communicatively couples service provider system 102 and subscriber devices 104.1 through 104.n. Communication network 106 can be implemented as a wireless communication network, a wired communication network, and/or any combination thereof as will be apparent to those skilled in the relevant art(s) without departing from the spirit and scope of the present disclosure. For example, communication network 106 can include one or more radio networks, such as terrestrial radio frequency networks or satellite radio frequency networks, one or more coaxial cable networks, one or more fiber optic cable networks, and/or another suitable communication network.

Exemplary Subscriber Device in the Point-to-Multipoint Communication System

Figure 2:
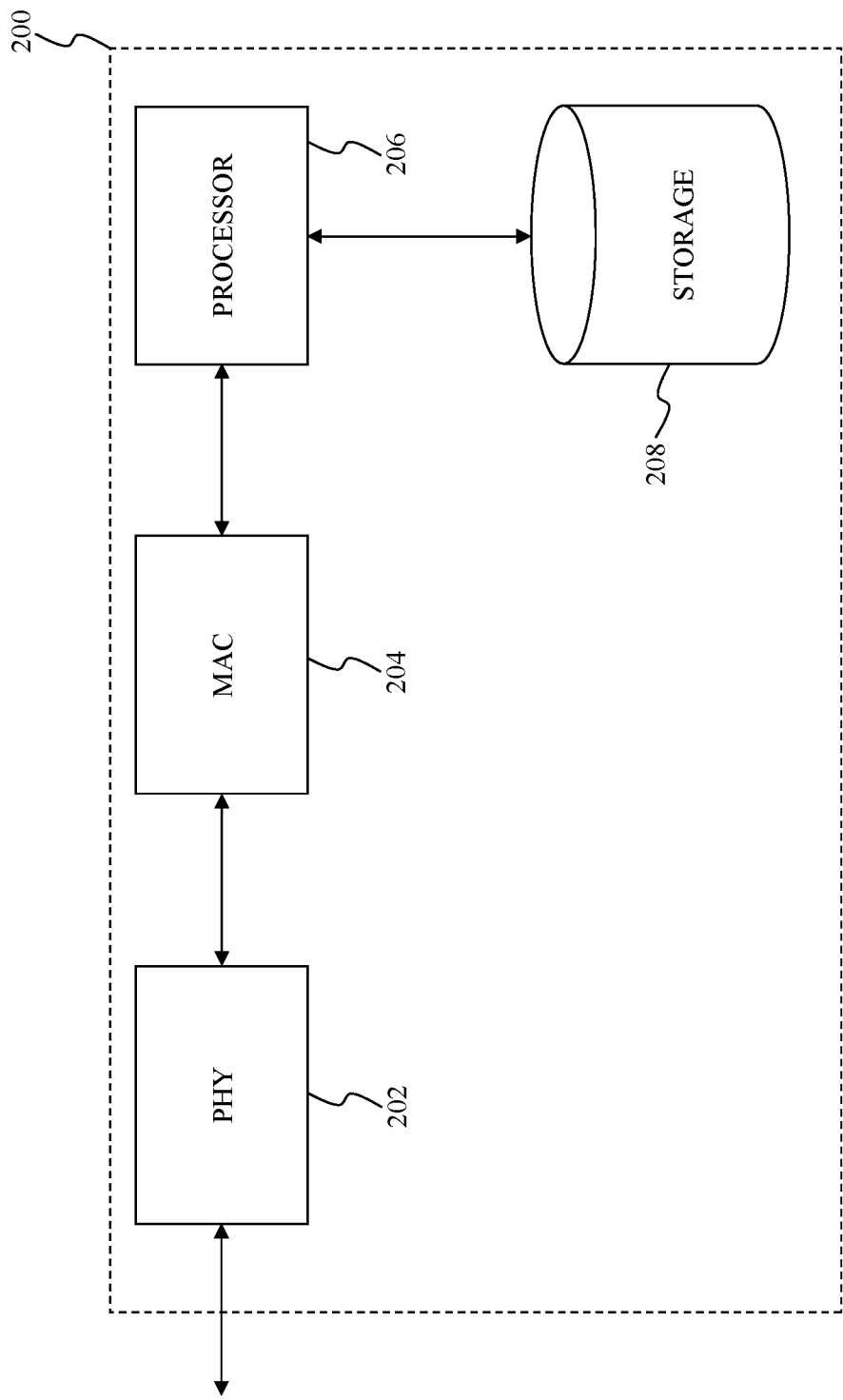
FIG. 2 illustrates a block diagram of a subscriber device, according to an embodiment of the present disclosure.

FIG. 2 illustrates a block diagram of an exemplary subscriber device 200 in exemplary point-to-multipoint communication system 100 according to an embodiment of the present disclosure. As illustrated in FIG. 2, subscriber device 200 includes PHY circuitry 202, media access controller (MAC) circuitry 204, processor circuitry 206, and storage medium 208. Subscriber device 200 can represent an exemplary embodiment of subscriber devices 104.1 through 104.n.

PHY circuitry 202 represents an interface between a communication network, such as communication network 106 to provide an example, and MAC circuitry 204. Generally, PHY circuitry 202 can modulate, encode, and/or convert an information frame to provide an information signal for transmission to the communication network. PHY circuitry 202 can also demodulate, decode, and/or convert an information signal received over a communication network to provide an information frame.

MAC circuitry 204 represents an interface between PHY circuitry 202 and processor circuitry 206. MAC circuitry 204 can manage and maintain communication by coordinating access to the communication network and formatting communication in accordance with one or more communication standards or protocols. MAC circuitry 204 can also de-encapsulate or de-frame in accordance with the one or more communication standards or protocols.

Processor circuitry 206 controls the overall operation of subscriber device 200. Processor circuitry 206 can access a suitable unique identifier of subscriber device 200 in storage medium 208. Processor circuitry 206 can calibrate a local time based on a universal time and a time offset as described above with reference to FIG. 1. Processor circuitry 206 can also process user requests, provide an interface (and process inputs made thereto), manage and control provision of the service once received, control the entry into and out of a standby mode, power the device on/off, load an operating system, and/or perform other suitable processing functions related to subscriber device 200. In an embodiment, functions performed by processor circuitry 206 can use the universal time or the local time.

Storage medium 208 stores configuration information about subscriber device 200 and other related information. Storage medium 208 can store configuration information as text files within a volatile memory, such as random access memory (RAM), and/or non-volatile memory, such as read-only memory (ROM). The RAM can be implemented in dynamic random-access memory (DRAM), a static random-access memory (SRAM), and/or a non-volatile random-access memory (NVRAM) configuration to provide some examples. Storage medium 208 can be organized into a database and can leverage any commercially available database management system such as Microsoft Access, Microsoft SQL server, an Oracle database, an IBM database, an SAP database, etc. Storage medium 208 can store a unique identifier for a particular subscriber device 200 for purposes of identifying subscriber device 200 in communications with service provider system 102. Storage medium can be any other suitable storage mechanism.

Exemplary Method to Synchronize the Time on a Subscriber Device

Figure 3:
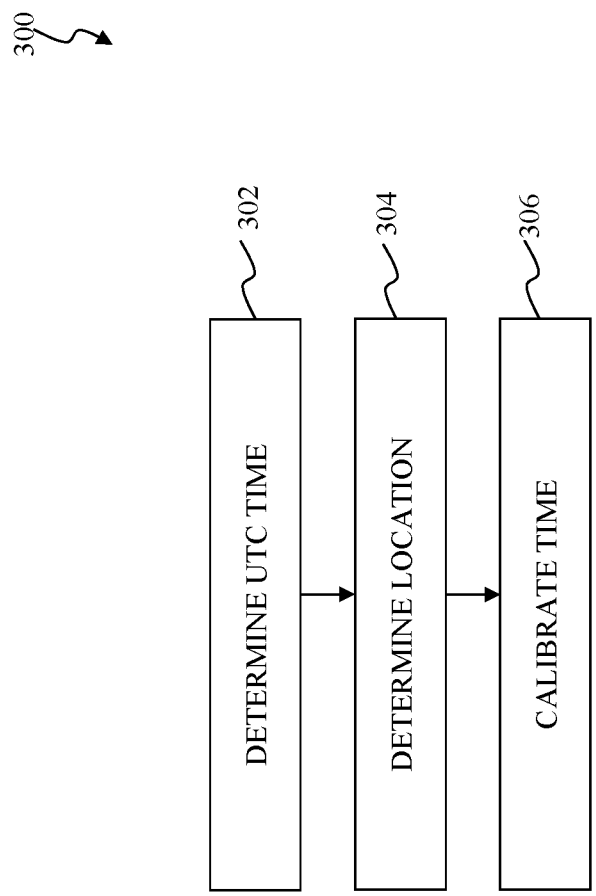
FIG. 3 is a flowchart of exemplary operational steps to determine a synchronized time on a subscriber device, according to an embodiment of the present disclosure.

FIG. 3 is a flowchart of exemplary operational steps to determine a local time on a subscriber device, according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary control flow 300 for calibrating a local time for a subscriber device, such as subscriber device 200 as described above in FIG. 1.

At operation 302, the operational control flow 300 determines a universal time, for example, years, months, days, hours, minutes, or seconds, for the subscriber device. This universal time represents a global, international, or world-wide time which is collectively shared by subscriber device 200 with other subscriber devices irrespective of their physical geographic locations as described above in FIG. 1. The operational control flow 300 can use a standardized networking protocol such as network time protocol (NTP), user datagram protocol (DBP), or any suitable networking protocol that will be apparent to one skilled in the art(s) without departing from the spirit and scope of the present disclosure to retrieve the universal time as will be apparent to one skilled in the art(s) without departing from the spirit and scope of the present disclosure.

At operation 304, the operational control flow 300 determines a physical geographic location of the subscriber device. The operational control flow 300 can retrieve appropriate physical geographic location information related to the subscriber device. In an embodiment, the operational control flow 300 can use a unique identifier for the subscriber device to retrieve the appropriate physical geographic location information for the subscriber device as described above in FIG. 1. In an embodiment, the operational control flow 300 can send the appropriate physical geographic location information to the subscriber device. In an alternate embodiment, the operational control flow 300 can use another suitable location determination system without departing from the spirit and scope of the present disclosure to determine the appropriate physical geographic location information of the subscriber device.

At operation 306, the operational control flow 300 calibrates a local time. Once the operational control flow 300 determines the physical geographic location of the subscriber device at operation 304, the operational control flow 300 calculates a time offset for the subscriber device. This time offset can represent a difference between the universal time, which is irrespective of physical geographic location of the subscriber device, and the local time, which is dependent on the physical geographic location of the subscriber device as determined in operation 304. In an embodiment, the operational control flow 300 can access a look-up table (LUT) to retrieve the time offset for the subscriber device using the physical geographic location of the subscriber device as determined in operation 304. The operational control flow 300 then calibrate the local time using the time offset and the universal time. The operational control flow 300 can increment and/or decrement the universal time of operation 302 by the time offset to calibrate the local time.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A subscriber device within a point-to-multipoint communication system, comprising:
   physical layer circuitry configured to:
      receive a first time, the first time being collectively shared by a plurality of subscriber devices within the point-to-multipoint communication system irrespective of their geographic locations; and
      transmit a subscriber-device identifier to a service provider system and, in response, receive a time offset corresponding to a geographic location of the subscriber device, wherein the service provider system retrieves the geographic location from a database using the subscriber-device identifier and calculates the time offset based on the geographic location; and
   processor circuitry configured to:
      determine a second time based on the first time and the time offset, the second time being unique to subscriber devices within the geographic location from among the plurality of subscriber devices;
      receive the service from the service provider system at a scheduled time based on the second time; and
      display a list of available services in an electronic program guide based on the second time.

2. The subscriber device of claim 1, wherein the subscriber device is further configured to:
   receive the service from the service provider system at a scheduled time based on the first time, and
   display the list of available services in the electronic program guide based on the first time.

3. The subscriber device of claim 1, wherein the service provider system determines the time offset based on the geographic location and a daylight savings time flag associated with the geographic location.

4. The subscriber device of claim 1, wherein the subscriber device determines the second time upon receiving power or switching out of a standby mode.

5. The subscriber device of claim 1, wherein the subscriber device receives the first time via a network time protocol.

6. The subscriber device of claim 1, wherein to transmit the subscriber-device identifier, the physical layer circuitry is further configured to use secure sockets layer or transport layer security.

7. The subscriber device of claim 1, wherein the service comprises audio data and video data.

8. A service provider system within a point-to-multipoint communication system having a subscriber device, the service provider system comprising:
   physical layer (PHY) circuitry configured to:
      receive a transmission from the subscriber device comprising a subscriber-device identifier; and
   processor circuitry configured to:
      retrieve from a storage medium a geographic location of the subscriber device based on the subscriber-device identifier; and
      determine a time offset based on the geographic location;
      send the time offset to the subscriber device for the determination of a local time, wherein the subscriber device determines the local time based on a universal time and the time offset; and
      provide the service to the subscriber device at a scheduled time based on the determined local time.

9. The service provider system of claim 8, wherein the service provider system is further configured to:
   retrieve a daylight savings time value for the geographic location; and
   use the daylight savings time value in determining the time offset.

10. The service provider system of claim 8, wherein the storage medium is a database and the service provider system retrieves the geographic location from the database using the subscriber-device identifier.

11. The service provider system of claim 8, wherein the service provider system receives the transmission when the subscriber device is powered on or brought out of a standby mode.

12. The service provider system of claim 8, wherein the service provider system sends the time offset to the subscriber device utilizing secure sockets layer or transport layer security to secure the transmission.

13. The service provider system of claim 8, wherein the service comprises audio data and video data.

14. The service provider system of claim 8, wherein the service provider system is further configured to transmit a list of available services to the subscriber device in an electronic program guide based organized according to the local time.

15. The service provider system of claim 8, wherein the service provider system is further configured to provide the service to the subscriber device at a scheduled time based on the universal time.

16. The service provider system of claim 8, wherein the service provider system determines the geographic location using a global positioning system.

17. A method for determining a local time for a subscriber device within a point-to-multipoint communication system, the method comprising:
   determining a first time, the first time being collectively shared by a plurality of subscriber devices within the point-to-multipoint communication system irrespective of their geographic locations;
   retrieving a geographic location for the subscriber device in the point-to-multipoint communication system based on a subscriber-device identifier received at a service provide system from the subscriber device;
   calculating a time offset corresponding to a geographic location of the subscriber device;
   calibrating a second time based on the first time and the time offset, the second time being unique to the subscriber device; and
   providing a list of available services in an electronic program guide on the subscriber device based on the second time.

18. The method of claim 17, the calculating further comprising:
   retrieving a daylight savings time value for the geographic location; and
   utilizing the daylight savings time value in calculating the time offset.

19. The method of claim 17, the determining further comprising:
   receiving the first time via a network time protocol.

20. The method of claim 18, the retrieving further comprising:
   fetching the geographic location from a database using the subscriber-device identifier.

* * * * *